(12) United States Patent
Su et al.

(10) Patent No.: US 10,288,329 B2
(45) Date of Patent: May 14, 2019

(54) CONDENSATION AND FALLING FILM EVAPORATION HYBRID HEAT EXCHANGER

(71) Applicants: JOHNSON CONTROLS TECHNOLOGY COMPANY, Holland, MI (US); YORK (WUXI) AIR CONDITIONING AND REFRIGERATION CO., LTD., Wuxi, Jiangsu (CN)

(72) Inventors: Xiuping Su, Jiangsu (CN); Li Wang, Jiangsu (CN)

(73) Assignees: Johnson Controls Technology Company, Auburn Hills, MI (US); York (Wuxi) Air Conditioning and Refrigeration Co., Ltd., Wuxi, Jiangsu (CN)

( * ) Notice: Subject to any disclaimer, the term of this patent is extended or adjusted under 35 U.S.C. 154(b) by 5 days.

(21) Appl. No.: 15/071,413

(22) Filed: Mar. 16, 2016

(65) Prior Publication Data
US 2016/0377331 A1     Dec. 29, 2016

(30) Foreign Application Priority Data

Jun. 29, 2015   (CN) .......................... 2015 1 0369666

(51) Int. Cl.
*F25B 39/00*     (2006.01)
*F28D 3/02*      (2006.01)
(Continued)

(52) U.S. Cl.
CPC .............. *F25B 39/00* (2013.01); *C09K 5/044* (2013.01); *F25B 39/028* (2013.01); *F28D 3/02* (2013.01);
(Continued)

(58) Field of Classification Search
CPC ........ F25B 39/00; F25B 39/028; F25B 39/04; F25B 41/067; F25B 41/06;
(Continued)

(56) References Cited

U.S. PATENT DOCUMENTS 3,269,135 A * 8/1966 Chubb .................. F28D 7/0066
                                                    165/100
3,270,517 A * 9/1966 Clark ........................ F25B 1/00
                                                    165/174
(Continued)

FOREIGN PATENT DOCUMENTS

CN          201983533         9/2011
CN          102288050         12/2011
(Continued)

OTHER PUBLICATIONS

CN 201510369666.9 Office Action dated Jun. 29, 2018.
CN 201510369666.9 Office Action dated Feb. 2, 2019.

*Primary Examiner* — Cassey D Bauer
(74) *Attorney, Agent, or Firm* — Fletcher Yoder, P.C.

(57) ABSTRACT

A condensation and falling film evaporation hybrid heat exchanger is provided, including a shell, a condenser entrance pipe connected to a compressor discharge port, and an evaporator exit pipe connected to a compressor suction port being disposed respectively on the shell. A baffle plate is disposed at a position inside the shell corresponding to the condenser entrance pipe. A refrigerant distributor is disposed in the shell, a condensing tube bundle being disposed above the refrigerant distributor, and a falling film evaporating tube bundle being disposed below the refrigerant distributor. The condensation and falling film evaporation hybrid heat exchanger according to this invention can be used in concert with low-pressure refrigerant, thus efficiently solving the (Continued)

problem of refrigerant distribution with the falling film evaporator using low-pressure refrigerant.

20 Claims, 6 Drawing Sheets (51) Int. Cl.
| | |
|---|---|
| C09K 5/04 | (2006.01) |
| F28F 25/04 | (2006.01) |
| F28F 25/06 | (2006.01) |
| F28F 27/00 | (2006.01) |
| F28D 5/02 | (2006.01) |
| F25B 39/02 | (2006.01) |
| F28D 3/04 | (2006.01) |
| F28D 21/00 | (2006.01) |

(52) U.S. Cl.
CPC .............. *F28D 3/04* (2013.01); *F28D 5/02* (2013.01); *F28F 25/04* (2013.01); *F28F 25/06* (2013.01); *F28F 27/00* (2013.01); *F25B 2339/046* (2013.01); *F25B 2339/047* (2013.01); *F25B 2500/18* (2013.01); *F28D 2021/007* (2013.01); *F28D 2021/0066* (2013.01); *F28D 2021/0071* (2013.01); *F28F 2250/06* (2013.01)

(58) Field of Classification Search
CPC ........ F25B 2339/0445; F25B 2339/044; F28D 2021/0066; B01D 2201/44; F28F 9/026; F28F 27/02
See application file for complete search history.

(56) References Cited

U.S. PATENT DOCUMENTS

| | | | |
|---|---|---|---|
| 4,437,322 A * | 3/1984 | Ertinger | ............... B23P 15/26 62/115 |
| 9,746,256 B2 | 8/2017 | Esformes et al. | |
| 2013/0277018 A1 | 10/2013 | Numata et al. | |

FOREIGN PATENT DOCUMENTS

| | | |
|---|---|---|
| CN | 202361704 | 8/2012 |
| CN | 202734369 U | 2/2013 |
| CN | 103512386 | 1/2014 |
| GB | 1206643 A | 9/1970 |
| JP | S60228894 A | 11/1985 |
| JP | S61125588 A | 6/1986 |
| JP | 2007198700 A | 8/2007 |
| SU | 1437673 | 11/1988 |
| WO | 2013074749 A1 | 5/2013 |

* cited by examiner

CONDENSATION AND FALLING FILM EVAPORATION HYBRID HEAT EXCHANGER

FIELD OF THE INVENTION

This invention is directed to the field of refrigerant and air-conditioning apparatus, in particular, a condensation and falling film evaporation hybrid heat exchanger.

BACKGROUND OF THE INVENTION

Typically, conventional refrigerant and air-conditioning units include four major components, namely, compressor, condenser, throttling device and evaporator.

Figure 1:
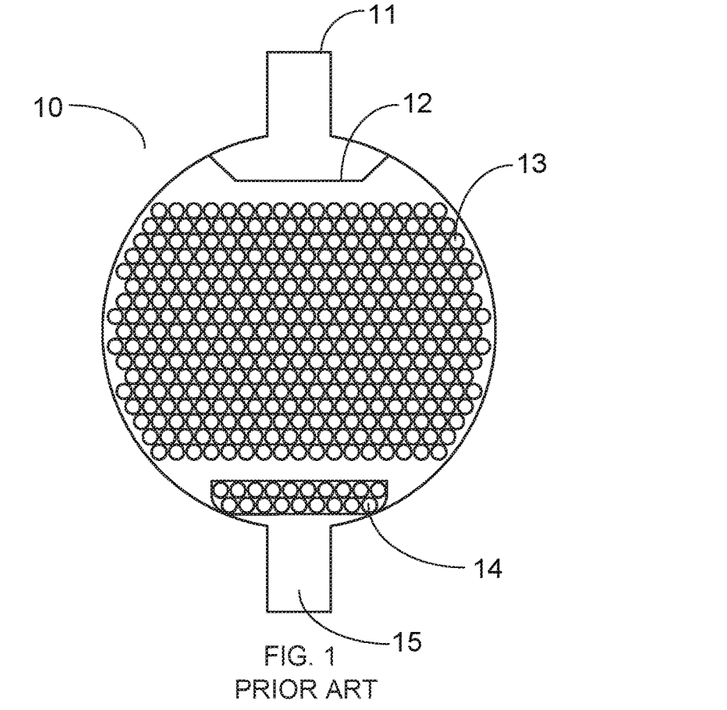
FIG. 1 is a section view of a prior art condenser.

A prior art condenser 10 generally adopts the structure as illustrated in FIG. 1, which has a refrigerant entrance 11, a refrigerant exit 15, a baffle plate 12 and a condensing tube bundle 13 being disposed or positioned inside the condenser 10, a subcooler 14 generally being further disposed or positioned at a bottom of the condenser 10.

Figure 2:
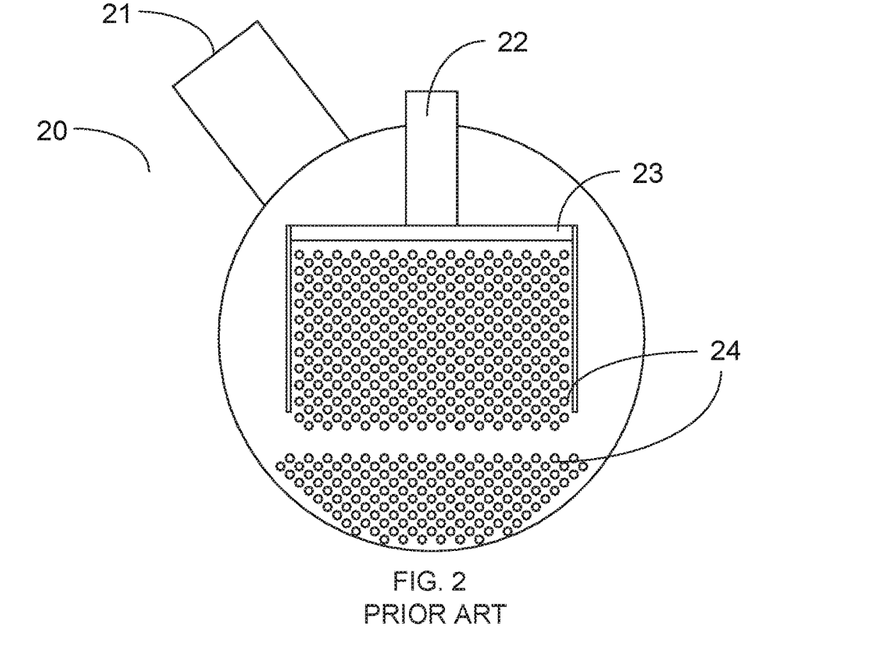
FIG. 2 is a section view of a prior art falling film evaporator.

A prior art falling film evaporator 20 with the characteristics such as higher heat transfer efficiency and lower refrigerant charge has been more and more frequently applied to the vapor compression systems in refrigeration, air conditioning and chilled liquid systems. The prior art falling film evaporator 20 generally adopts the structure as illustrated in FIG. 2, including an evaporator exit pipe 21, a feeding pipe 22, a refrigerant distributor 23 and an evaporating tube bundle 24. The refrigerant distributor 23 in FIG. 2 is a key component of the falling film evaporator 20, and in order to achieve uniform distribution of the refrigerant to the evaporating tube bundle 24, it is necessary that sufficient pressure difference exists between an interior and an exterior of the refrigerant distributor 23. In a system with middle and high-pressure refrigerant (e.g. R134a, etc.), the pressure difference between the interior and the exterior of the refrigerant distributor 23 generally reaches 150-300 kPa.

The low-pressure refrigerant R1233zd(E) has received increased attention in the HVAC&R industry due to its advantages such as environmental friendliness and high efficiency, etc. Under a typical working condition (evaporation temperature 5° C., condensation temperature 36.7° C.), in a comparison between R1233zd(E) and R134a in terms of evaporation pressure and condensation pressure, the difference between the evaporation pressure and the condensation pressure of R1233zd(E) is only 23.1% of that of R134a. With respect to low-pressure refrigerants like R1233zd(E), the refrigerant distributor 23 in the conventional or prior art falling film evaporator 20 may not be able to satisfy operating load requirements.

Accordingly, there is a need for a condensation and falling film evaporation hybrid heat exchanger that can be used with low-pressure refrigerant, thus efficiently solving the problem of refrigerant distribution with the falling film evaporator using low-pressure refrigerant.

BRIEF DESCRIPTION OF THE INVENTION

In order to solve the aforesaid problems, this invention provides a condensation and falling film evaporation hybrid heat exchanger for a refrigerant and air-conditioning unit, including a shell, wherein a condenser entrance pipe connected to the compressor discharge port, and an evaporator exit pipe connected to the compressor suction port are disposed respectively on the shell. A refrigerant distributor is disposed in the shell, a condensing tube bundle being disposed above the refrigerant distributor, and a falling film evaporating tube bundle being disposed the refrigerant distributor.

In one embodiment, a baffle plate is included, the baffle plate being disposed at a position inside the shell corresponding to the condenser entrance tube.

In one embodiment, the refrigerant distributor is a perforated plate with multiple through-holes disposed thereon.

In one embodiment, hollow short tubes along the direction of the condensing tube bundle extending out of the perforated plate are disposed on the perforated plate, the hollow short tubes being configured to be equally spaced apart from each other.

In one embodiment, the hollow short tubes have at least two different heights, the hollow short tubes with the same height being configured to be equally spaced apart from each other.

In one embodiment, floaters are disposed in the through-holes.

In one embodiment, the through-hole is configured as a taper hole with a downward conical tip, and a lower portion of the floater is configured as a cone cooperating with the through-hole.

In one embodiment, the floater comprises a floater rod and a floater body disposed at the top end of the floater rod, a cavity being disposed inside the floater rod, multiple groove-shaped through-holes connected to the cavity of the floater rod being disposed on the floater rod.

In one embodiment, top portions of the multiple floaters are connected by a connector.

In one embodiment, floater bodies of the floaters are connected by a connector.

In one embodiment, the floaters are connected to a controller, the controller controlling the rising and falling of the floaters.

In one embodiment, an additional perforated plate is disposed in the shell above the refrigerant distributor, and divides multiple condensing tube bundles into upper and lower groups.

In one embodiment, the cross-section of the shell vertical to the extension direction of the condensing tube bundle is a circle or a rectangle.

In one embodiment, a bypass pipe is disposed at one side of the shell connected to a bottom of the condensing tube bundle and a bottom of the falling film evaporating tube bundle.

In one embodiment, a regulating valve is disposed on the bypass pipe.

In one embodiment, the condensation and falling film evaporation hybrid heat exchanger includes a shell, a condenser entrance pipe connected to the compressor discharge port, and an evaporator exit pipe connected to the compressor suction port being disposed respectively on the shell. A baffle plate is disposed at a position inside the shell corresponding to the condenser entrance tube. A refrigerant distributor is disposed in the shell, a condensing tube bundle being disposed above the refrigerant distributor, and a falling film evaporating tube bundle being disposed below the refrigerant distributor. The condensation and falling film evaporation hybrid heat exchanger can be used with low-pressure refrigerant, thus efficiently solving the problem of refrigerant distribution with the falling film evaporator using low-pressure refrigerant.

Other features and advantages of the present invention will be apparent from the following more detailed description, taken in conjunction with the accompanying drawings which illustrate, by way of example, the principles of the invention.

BRIEF DESCRIPTION OF THE DRAWINGS

The following drawings of the embodiments in this invention constitute a part of this invention for understanding this invention. The drawings illustrate the embodiments of this invention and the descriptions thereof for explaining the principles of this invention. The drawings are provided as follows.

DETAILED DESCRIPTION OF THE INVENTION

In the following descriptions, many details are given for more thorough understanding of this invention. However, it is obvious for those skilled in the art that the embodiments of this invention can be implemented without one or more details of such. In other examples, to avoid confusion with the embodiments of this invention, some common technical features in the art are not described.

For thorough understanding of the embodiments of this invention, the detailed structures are brought forward in the following descriptions. Obviously, the implementation of the embodiments of this invention is not limited to such special details that those skilled in the art are familiar with. The more preferable embodiments of this invention are described in details as follows, while apart from such detailed descriptions, this invention may have other embodiments.

Figure 3:
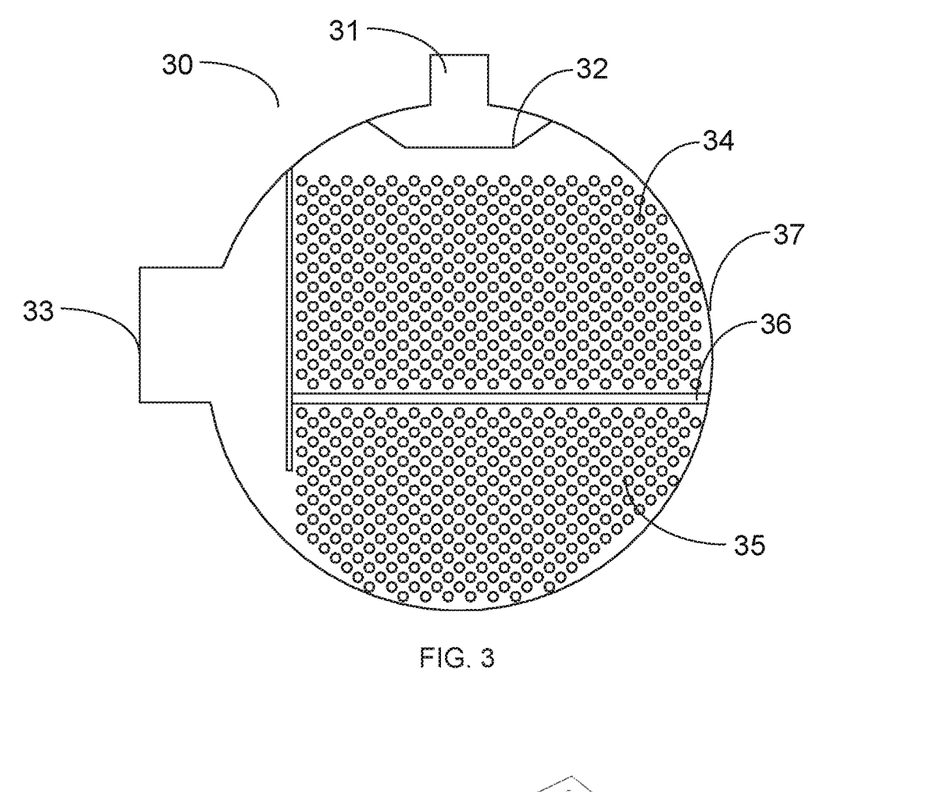
FIG. 3 is a section view of a condensation and falling film evaporation hybrid heat exchanger according to an embodiment of this invention.

Referring to FIG. 3, the condensation and falling film evaporation hybrid heat exchanger 30 includes a shell 37.

The cross-section of the shell 37 in the embodiment as illustrated is a circle, a condenser entrance pipe 31 and an evaporator exit pipe 33 being disposed on the shell 37. The condenser entrance pipe 31 is to be connected to the compressor discharge port (not illustrated). The evaporator exit pipe 33 is to be connected to the compressor suction port (not illustrated).

A baffle plate 32 is disposed at a position inside the shell corresponding to the condenser entrance tube 31 for slowing down and reducing the impact of refrigerant gas entering into the shell 37 from the condenser entrance tube 31 on the condensing tube bundle 34.

A refrigerant distributor 36 is disposed at a roughly central position of the shell 37, the refrigerant distributor 36 being disposed roughly horizontally as illustrated, above which the condensing tube bundle 34 (condensing tubes) are disposed and form the condenser (region). The falling film evaporating tube bundle 35 (evaporation tubes) is disposed below the refrigerant distributor 36 and form the evaporator (region).

The condensation and falling film evaporation hybrid heat exchanger 30 of this invention operates in such a way: while the system is operating, the refrigerant gas from the compressor discharge port (not illustrated) enters into the shell 37 of the condensation and falling film evaporation hybrid heat exchanger 30 via the condenser entrance pipe 31, and after passing the condensing tube bundle 34, is condensed as high-pressure liquid, with liquid droplets being equally or uniformly provided or distributed to the refrigerant distributor 36. The refrigerant distributor 36 may produce a pressure difference required by refrigeration cycle, and the high-pressure refrigerant liquid via the refrigerant distributor 36 may be changed into low-pressure two-phase fluid, with liquid droplets of the two-phase fluid being equally or uniformly provided or distributed to the falling film evaporating tube bundle 35 for evaporation, and then be changed into low-temperature low-pressure refrigerant vapor, and finally via the evaporator exit pipe 33 returns the compressor suction port (not illustrated).

Therefore, the condensation and falling film evaporation hybrid heat exchanger of this invention makes use of the characteristic of equal distribution of the refrigerant liquid dripped from the condensing tube bundle so that equal distribution of the refrigerant required by the falling film evaporator can be achieved requiring no complicated refrigerant distributor. The refrigerant distributor functions as a throttling device at the same time.

Figure 4:
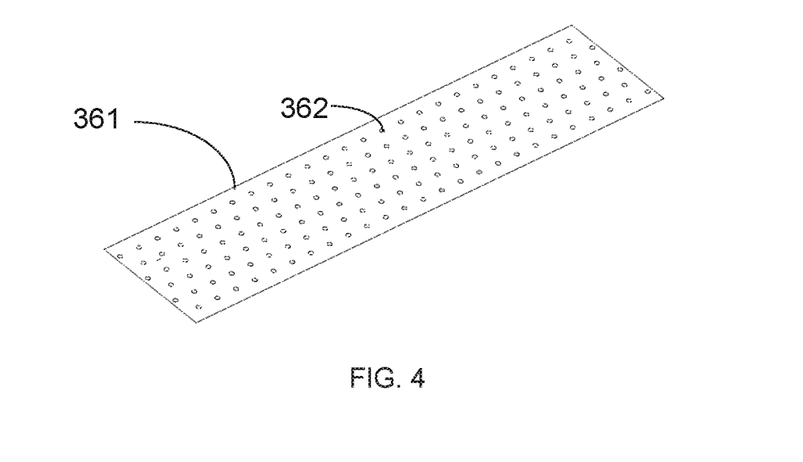
FIG. 4 is a stereoscopic view of a refrigerant distributor according to the first embodiment of this invention.

FIG. 4 illustrates the first embodiment of the refrigerant distributor 36 of this invention. Specifically, the refrigerant distributor 36 in the embodiment as illustrated is a perforated plate 361, multiple through-holes 362 being disposed on the perforated plate 361. For equal distribution, the through-holes 362 are equally disposed on the perforated plate 361. Those skilled in the art should know that pressure difference above and below the perforated plate 361 may satisfy the pressure difference required by refrigeration cycle.

Figure 5:
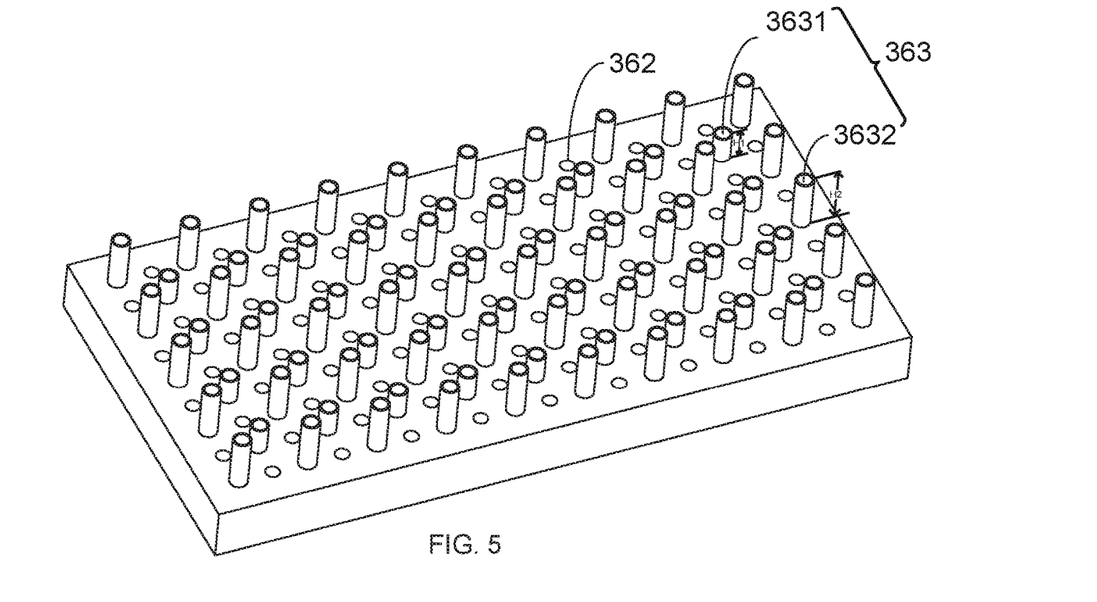
FIG. 5 is a stereoscopic view of a refrigerant distributor according to the second embodiment of this invention.

Referring to FIG. 5, in the second embodiment of the refrigerant distributor 36 of this invention, hollow short tubes 363 extending upward and out of the perforated plate 361 are disposed at a portion of the through-holes 362. In other words, hollow short tubes 363 extend out with certain heights from the perforated plate 361 facing to the condensing tube bundle 34. An axially penetrating through-hole may be disposed inside the hollow short tubes 363 so that the short tubes 363 are connected to the through-holes 362, and equally spaced apart from each other on the perforated plate 361.

It can be understood that the hollow short tubes 363 may not be disposed at the through-holes 362 already on the perforated plate 361, but may be disposed penetrating the perforated plate 361 independent from the through-holes 362.

Further, the hollow short tubes 363 may have different heights, and the hollow short tubes with same height are equally spaced apart from each other. In FIG. 5, the hollow short tubes 363 with two heights are illustrated as an example, wherein the height of first hollow short tubes 3631 is H1, and the height of second hollow short tubes 3632 is H2. The height H2 of the second hollow short tubes 3632 is larger than the height H1 of the first hollow short tubes 3631.

In this way, in the process of operation of the unit, the refrigerant flows from the condenser (the part above the refrigerant distributor 36) into the evaporator (the part below the refrigerant distributor 36) via the through-holes 362. If the flow via the through-holes 362 is insufficient, the liquid level in the condenser (the part above the refrigerant distributor 36) will rise.

When the liquid level exceeds the height H1 of the first hollow short tubes 3631, a part of the refrigerant will run from the condenser (the part above the refrigerant distributor 36) into the evaporator (the part below the refrigerant distributor 36) via the through-holes inside the first hollow short tubes 3631, so as to increase the flow of the refrigerant. If the flow is still insufficient, the liquid level in the condenser (the part above the refrigerant distributor 36) will further rise.

When the liquid level exceeds the height H2 of the second hollow short tubes 3632, a part of the refrigerant will flow from the condenser (the part above the refrigerant distributor 36) into the evaporator (the part below the refrigerant distributor 36) via the through-holes inside the second hollow short tubes 3632 so as to further increase the flow of the refrigerant.

To the contrary, if the flow is too large, the liquid level in the condenser (the part above the refrigerant distributor 36) will fall. When the liquid level is lower than the height H2 of the second hollow short tubes 3632, the refrigerant will no longer run towards the evaporator via the second hollow short tubes 3632, so as to decrease the flow of the refrigerant. The principle and function of the first hollow short tubes 3631 are similar to the above.

Figure 6:
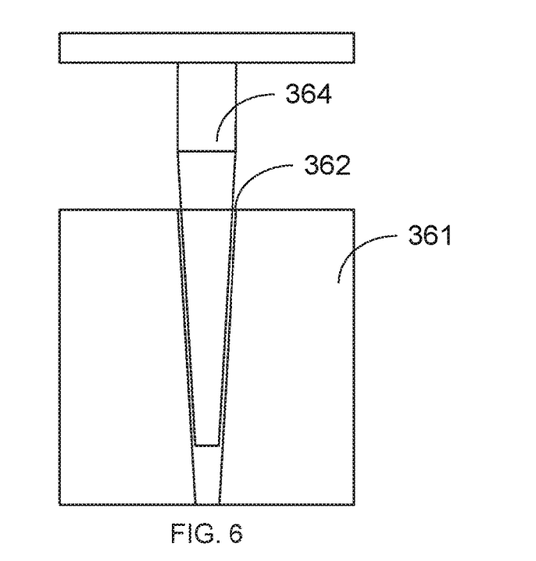
FIG. 6 is a section view of a refrigerant distributor according to the third embodiment of this invention.

FIG. 6 illustrates the third embodiment of a refrigerant distributor 36 of this invention. In this embodiment, a floater 364 is disposed in the through-tube 362. Specifically, the through-tube 362 may be configured as a taper hole with a downward conical tip, while the floater 364 may be configured as a cone cooperating with the through-hole 362.

The refrigerant distributor 36 is composed of the perforated plate 361 and the floater 364, and the floater may be made of the material with density less than the refrigerant liquid so that the floater stressed by the buoyant force from the refrigerant liquid may at least partially move upward from the through-hole 362 when it is in touch with the refrigerant liquid.

The through-hole 362 on the perforated plate 361 in the embodiment as illustrated in FIG. 6 is a taper hole. The floater 364 is provided with a segment of cone cooperating with the through-hole 362 in the form of taper hole. In operation, when the liquid level in the condenser rises, the refrigerant liquid is in touch with the cone part of the floater 364, and the buoyant force that the floater 364 receives is greater than the gravity force itself, and thus the floater 364 moves upward. In this way, the refrigerant liquid may run towards the evaporator via the hole space between the through-tube 362 on the perforated plate 361 and the cone of the floater 364.

When the liquid level in the condenser rises, the buoyant force that the floater 364 receives increases and the floater 364 goes up so that the hole space is enlarged and the flow of the refrigerant passing the refrigerant distributor 36 increases. Subsequently, regulation of the refrigerant flow is achieved.

When the liquid level in the condenser falls, the buoyant force that the floater 364 receives decreases and the floater 364 goes down so that the hole space is diminished and the flow of the refrigerant passing the refrigerant distributor 36 decreases. Subsequently, regulation of the refrigerant flow is achieved.

Figure 7:
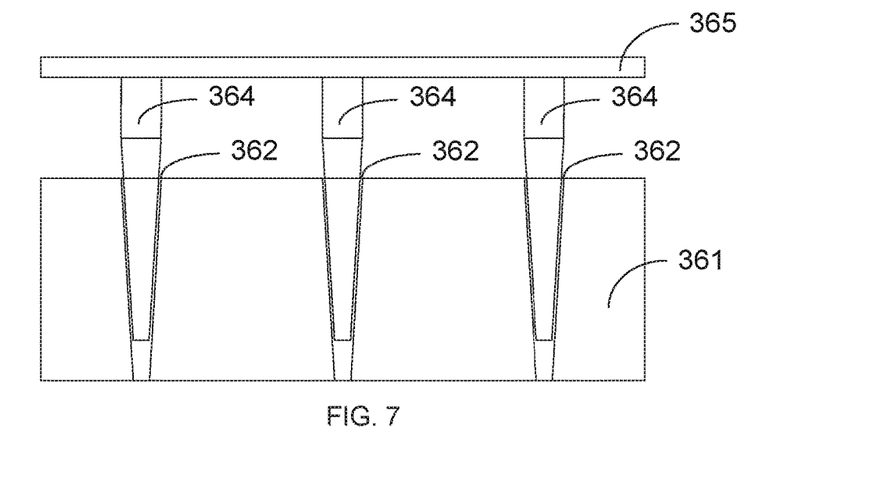
FIG. 7 is a section view of a refrigerant distributor according to the fourth embodiment of this invention.

Referring to FIG. 7, in which the refrigerant flow is even and controllable, the top portions of the multiple floaters may be connected by a connector.

Specifically, FIG. 7 illustrates the fourth embodiment of the refrigerant distributor 36 of this invention. The refrigerant distributor 36 is composed of the perforated plate 361 and the floaters 364, and the multiple floaters 364 are connected together by a flat 365 (one example of the connector) so that the multiple floaters 364 connected together may go up or down simultaneously and consequently the hole space between the floaters 364 and the through-tubes 362 is enlarged or diminished synchronously.

Further, a controller (not illustrated) connected to the connector may also be disposed, i.e. upward and downward movement of the floaters 364 connected together may be controlled such as by a stepping motor (one example of the controller) so that control of the refrigerant flow is achieved.

Figure 8A:
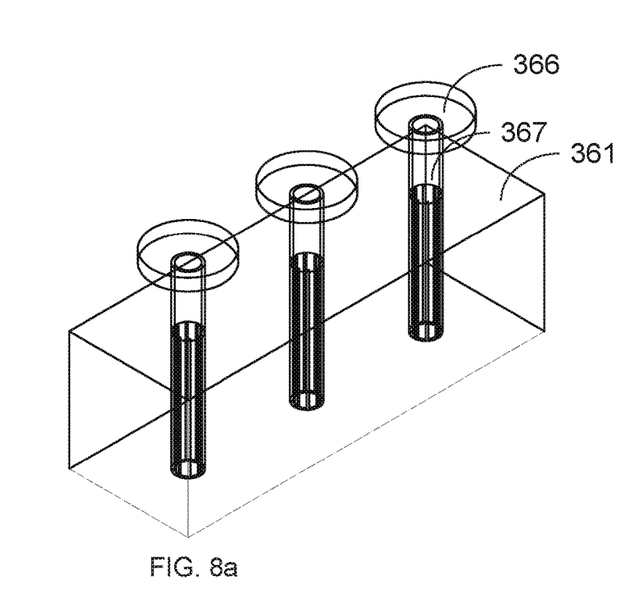
FIG. 8a is a stereoscopic view of a refrigerant distributor according to the fifth embodiment of this invention.
Figure 8B:
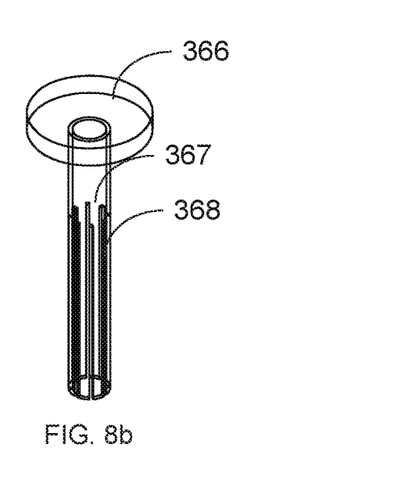
FIG. 8b is a stereoscopic view of a refrigerant distributor according to the fifth embodiment of this invention, wherein a single floater is illustrated.

Referring to FIG. 8a and FIG. 8b, the fifth embodiment of the refrigerant distributor 36 of this invention is illustrated. Alternatively, as illustrated in FIG. 8b, the floater 364 includes a floater rod 367 and a floater body 366 disposed on the top end of the floater rod 367. The floater body 366 may radially extend out of the floater 367. A cavity may be disposed inside the floater rod 367, and multiple through-holes connected to the cavity of the floater rod 367 are disposed on a peripheral surface of the floater rod 367. In this embodiment, the through-holes are groove-shaped through-holes 368, which extend radially on the peripheral surface of the floater rod 367 and are connected to the cavity of the floater rod 367 in the radial direction of the floater rod 367. Of course, the through-holes may be constituted in other shapes, such as circular through-holes or rectangular through-holes, etc. The refrigerant may, via the groove-shaped through-holes 368 on the floater rod 367, enter into the floater rod 367 and further flow towards the evaporator.

In operation, when the liquid level in the condenser rises up, the buoyant force that the floater rod 367 receives increases. The floater 364 moves upward so that the area of the groove-shaped through-holes 368 higher than the perforated plate 361 is enlarged. Subsequently, the flow of the refrigerant passing the groove-shaped through-holes 368 increases.

When the liquid level in the condenser falls down, the buoyant force that the floater rod 367 receives decreases. The floater 364 moves downward so that the area of the groove-shaped through-holes 368 higher than the perforated plate 361 is diminished. Subsequently, the flow of the refrigerant passing the groove-shaped through-holes 368 decreases so that regulation of the refrigerant flow is achieved.

In addition, as illustrated in FIG. 8a, the floater bodies 366 of the multiple floaters 364 may also be connected together as an entirety by the connector as above, and the rising and falling of the floaters 364 connected together may be controlled by the controller such as a stepping motor as well so as to regulate the flow.

Figure 9:
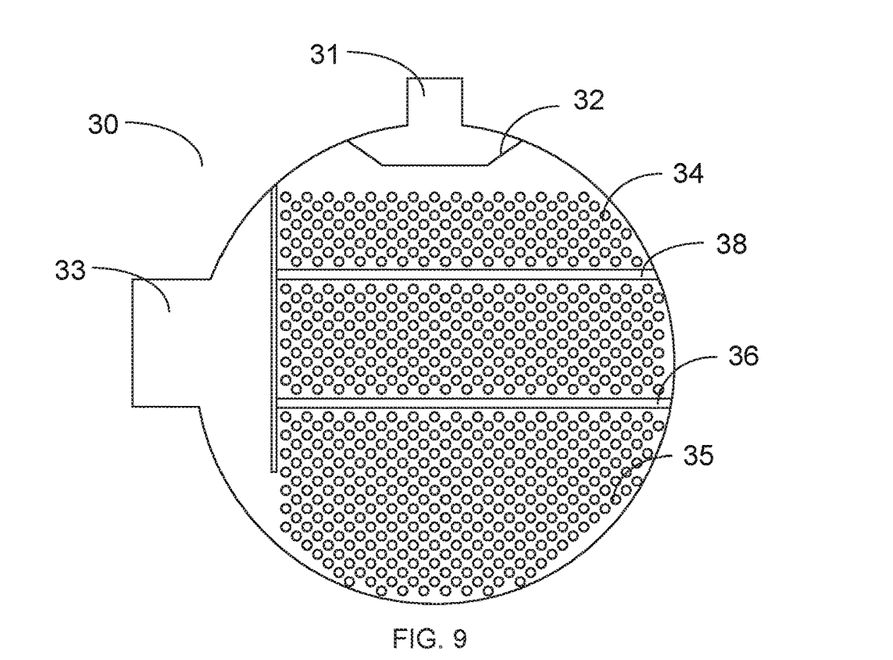
FIG. 9 is a section view of a condensation and falling film evaporation hybrid heat exchanger according to another embodiment of this invention.

Now switching to FIG. 9, another embodiment of the condensation and falling film evaporation hybrid heat exchanger 30 of this invention is illustrated. Compared with the embodiment as illustrated in FIG. 3, a piece of additional perforated plate 38 is added in the condensing tube bundle 34. The additional perforated plate 38 is disposed above the refrigerant distributor 36 and divides the condensing tube bundle 34. The additional perforated plate 38 may be disposed roughly parallel to the condenser distributor 36, and function to throttle flow and reduce pressure, thereby increasing refrigerating output.

Figure 10:
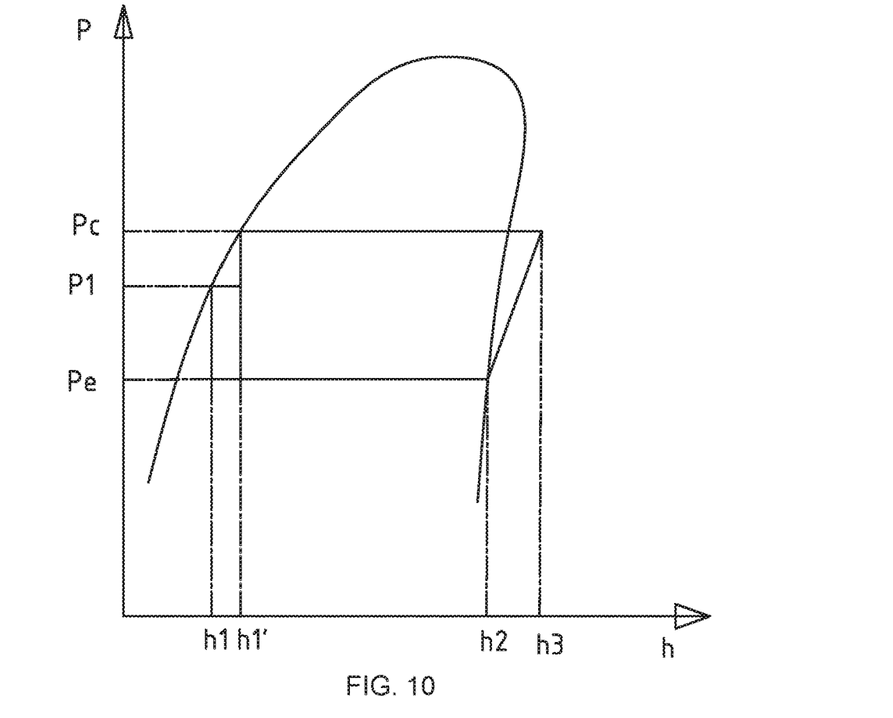
FIG. 10 is a refrigeration cycle diagram of a condensation and falling film evaporation hybrid heat exchanger with an additional perforated plate.

FIG. 10 illustrates a Log P-h diagram of a refrigeration cycle, wherein DP=Pc−P1 refers to a pressure drop produced by the additional perforated plate 38, and DH=h1'−h1 refers to the added enthalpy after adopting the additional perforated plate 38. It can be seen from this figure that without the additional perforated plate 38, refrigeration cycle efficiency is: COP1=(h2−h1')/(h3−h2), while with the additional perforated plate 38, refrigeration cycle efficiency is: COP2=(h2−h1)/(h3−h2). After the additional perforated plate 38 is adopted, refrigeration cycle efficiency increases DH/(h3−h2).

Figure 11:
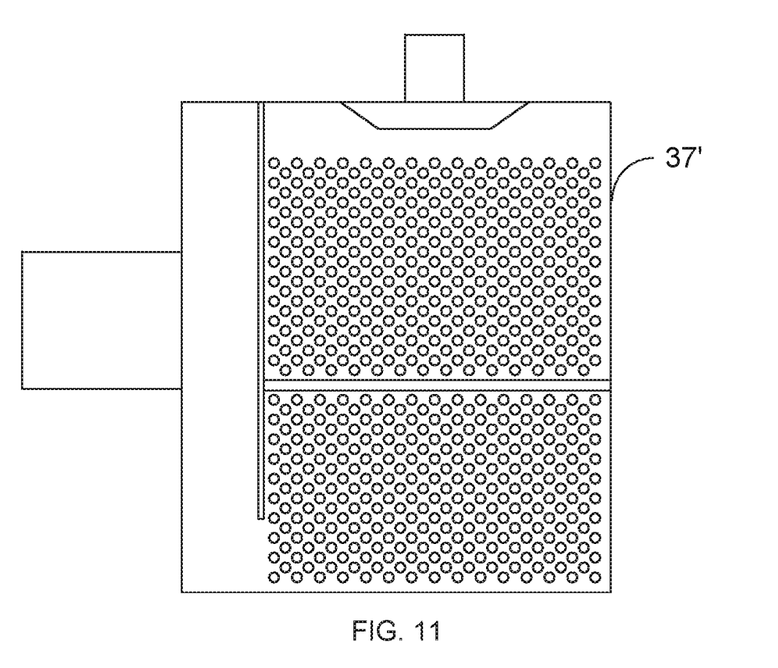
FIG. 11 is a section view of a condensation and falling film evaporation hybrid heat exchanger according to a further embodiment of this invention.

In addition, as illustrated in FIG. 11, the cross-section shape of the shell 37 of the condensation and falling film evaporation hybrid heat exchanger 30 of this invention may be a circle or a rectangle. Since the low-pressure refrigerant is adopted and a side of the container shell 37 is not pressure-bearing, either a circular shell or a rectangular shell 37' as illustrated in FIG. 11 may be adopted, simplifying both pipe distribution and production.

Figure 12:
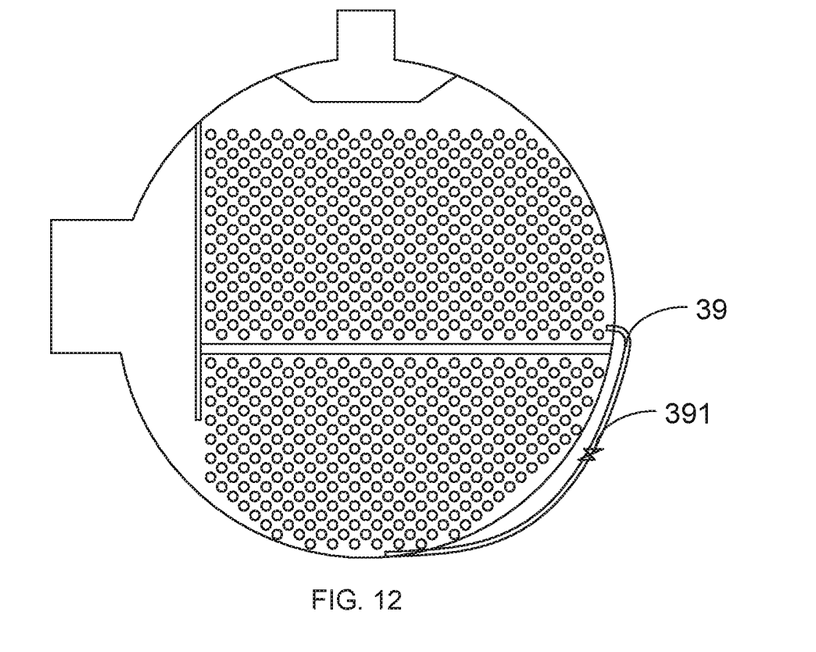
FIG. 12 is a section view of a condensation and falling film evaporation hybrid heat exchanger according to an additional embodiment of this invention.

As illustrated in FIG. 12, in another embodiment, a bypass pipe 39 is disposed between a bottom of the condenser (an upper part of the refrigerant distributor 36) and a bottom of the evaporator (a lower part of the refrigerant distributor 36), i.e. one side of the shell is provided with a bypass pipe connected to a bottom of the condensing tube bundle and a bottom of the falling film evaporating tube bundle.

Further, a regulating valve 391 is disposed on the bypass pipe 39, and the refrigerant flow entering into the evaporator may be regulated by the regulating valve 391 on the bypass pipe 391. Under the circumstances, those skilled in the art should know that heat exchange tubes at the bottom of the evaporator are equivalent to full-liquid heat exchange, while at the top, it is still falling film heat exchange.

This invention has been explained by the aforesaid embodiments. However, it should be understood that the aforesaid embodiments are only for the purpose of giving examples and making explanations, rather than having this invention limited to the scope of the embodiments described. Furthermore, those skilled in the art are in a position to understand that this invention is not limited to the aforesaid embodiments, and according to the instructions of this invention, more modifications and revisions may be made, which all fall into the protection scope of this invention.

DESCRIPTION OF DRAWING SIGNS 10. condenser
11. refrigerant entrance
12. baffle
13. condensing tube bundle
14. subcooler
15. refrigerant exit
20. falling film evaporator
21. evaporator exit pipe
22. feeding pipe
23. refrigerant distributor
24. evaporator tube bundle
30. condensation and falling film evaporation hybrid heat exchanger
31. condenser entrance pipe
32. baffle
33. evaporator exit pipe
34. condensing tube bundle
35. falling film evaporating tube bundle
36. refrigerant distributor
361. perforated plate
362. through-hole
363. hollow short tube
3631. first hollow short tube
3632. second hollow short tube
364. floater
365. flat
366. floater body
367. floater rod
368. groove-shaped through-hole
37. shell
37'. shell
38. additional perforated plate
39. by-pass pipe
391. regulating valve

What is claimed is:

1. A condensation and falling film evaporation hybrid heat exchanger for a refrigeration and air-conditioning unit, comprising:
    a shell;
    a condenser entrance pipe disposed on the shell and configured to connect to a compressor discharge port;
    an evaporator exit pipe disposed on the shell and configured to connect to a compressor suction port;
    a refrigerant distributor disposed in the shell;
    a condensing tube bundle disposed above the refrigerant distributor within a condenser region; and
    a falling film evaporating tube bundle disposed below the refrigerant distributor within an evaporator region;
    wherein the refrigerant distributor comprises a perforated plate with a plurality of through-holes disposed therein; and
    wherein the plurality of through-holes is configured to receive liquid refrigerant from a bottom portion of the condenser region, to direct the liquid refrigerant downwardly toward a top portion of the evaporator region, and to distribute the liquid refrigerant across a top of the falling film evaporating tube bundle as a plurality of liquid refrigerant droplets.

2. The condensation and falling film evaporation hybrid heat exchanger of claim 1, comprising a baffle plate disposed at a position inside the shell corresponding to the condenser entrance pipe.

3. The condensation and falling film evaporation hybrid heat exchanger of claim 1, wherein the refrigerant distributor comprises a plurality of hollow tubes disposed on the perforated plate and extending outwardly from the perforated plate toward the condensing tube bundle, the plurality of hollow tubes are arranged along an extension direction of the condensing tube bundle, and the plurality of hollow tubes are equally spaced apart from one another.

4. The condensation and falling film evaporation hybrid heat exchanger of claim 3, wherein:

the plurality of hollow tubes have at least two different heights; and hollow tubes of the plurality of hollow tubes with a same height are equally spaced apart from one another.

5. The condensation and falling film evaporation hybrid heat exchanger of claim 1, wherein a plurality of floaters are disposed in the plurality of through-holes.

6. The condensation and falling film evaporation hybrid heat exchanger of claim 5, wherein:

at least one through-hole of the plurality of through-holes is configured as a taper hole with a downward conical tip; and a lower portion of at least one floater of the plurality of floaters is configured as a cone cooperating with the at least one through-hole.

7. The condensation and falling film evaporation hybrid heat exchanger of claim 5, wherein:

at least one floater of the plurality of floaters comprises a floater rod and a floater body disposed at a top end of the floater rod;

a cavity is disposed inside the floater rod; and a plurality of groove-shaped through-holes on the floater rod are connected to the cavity.

8. The condensation and falling film evaporation hybrid heat exchanger of claim 6, wherein top portions of the plurality of floaters are connected by a connector.

9. The condensation and falling film evaporation hybrid heat exchanger of claim 7, wherein the at least one floater comprises two floaters, and the floater bodies of the two floaters are connected by a connector.

10. The condensation and falling film evaporation hybrid heat exchanger of claim 8, wherein the plurality of floaters is operatively connected to a controller, and the controller is configured to control rising and falling of the plurality of floaters.

11. The condensation and falling film evaporation hybrid heat exchanger of claim 9, wherein the two floaters are operatively connected to a controller, and the controller is configured to control rising and falling of the two floaters.

12. The condensation and falling film evaporation hybrid heat exchanger of claim 1, comprising an additional perforated plate disposed in the shell above the refrigerant distributor and dividing the condensing tube bundle into upper and lower groups.

13. The condensation and falling film evaporation hybrid heat exchanger of claim 1, wherein a cross-section of the shell perpendicular to an extension direction of the condensing tube bundle is circular or rectangular.

14. The condensation and falling film evaporation hybrid heat exchanger of claim 1, comprising a bypass pipe disposed at one side of the shell, wherein a first end of the bypass pipe is connected to the shell above the refrigerant distributor, and a second end of the bypass pipe is connected to the shell below the refrigerant distributor.

15. The condensation and falling film evaporation hybrid heat exchanger of claim 14, wherein a regulating valve is disposed on the bypass pipe.

16. A condensation and falling film evaporation hybrid heat exchanger for a refrigeration and air-conditioning unit, comprising:

a shell;

a condenser entrance pipe disposed on the shell and configured to connect to a compressor discharge port;

an evaporator exit pipe disposed on the shell and configured to connect to a compressor suction port;

a refrigerant distributor disposed in the shell;

a condensing tube bundle disposed above the refrigerant distributor; and a falling film evaporating tube bundle disposed below the refrigerant distributor;

wherein the refrigerant distributor comprises a perforated plate with a plurality of through-holes disposed therein;

wherein the refrigerant distributor comprises a plurality of hollow tubes disposed on the perforated plate and extending outwardly from the perforated plate toward the condensing tube bundle, the plurality of hollow tubes are arranged along an extension direction of the condensing tube bundle, and the plurality of hollow tubes are equally spaced apart from one another; and wherein the plurality of hollow tubes have at least two different heights, and hollow tubes of the plurality of hollow tubes with a same height are equally spaced apart from one another.

17. The condensation and falling film evaporation hybrid heat exchanger of claim 16, comprising a baffle plate disposed at a position inside the shell corresponding to the condenser entrance pipe.

18. A condensation and falling film evaporation hybrid heat exchanger for a refrigeration and air-conditioning unit, comprising:

a shell;

a condenser entrance pipe disposed on the shell and configured to connect to a compressor discharge port;

an evaporator exit pipe disposed on the shell and configured to connect to a compressor suction port;

a refrigerant distributor disposed in the shell;

a condensing tube bundle disposed above the refrigerant distributor; and a falling film evaporating tube bundle disposed below the refrigerant distributor;

wherein the refrigerant distributor comprises a perforated plate with a plurality of through-holes disposed therein;

wherein a plurality of floaters are disposed in the plurality of through-holes; and wherein at least one through-hole of the plurality of through-holes is configured as a taper hole with a downward conical tip, and a lower portion of at least one floater of the plurality of floaters is configured as a cone cooperating with the at least one through-hole.

19. The condensation and falling film evaporation hybrid heat exchanger of claim 18, wherein top portions of the plurality of floaters are connected by a connector.

20. The condensation and falling film evaporation hybrid heat exchanger of claim 19, wherein the plurality of floaters is operatively connected to a controller, and the controller is configured to control rising and falling of the plurality of floaters.

* * * * *